(12) United States Patent
Isogai et al.

(10) Patent No.: US 8,319,382 B2
(45) Date of Patent: Nov. 27, 2012

(54) ELECTRIC MOTOR HAVING WIRE CONNECTION STRUCTURE AND WIRE CONNECTION METHOD FOR THE SAME

(75) Inventors: Shigetaka Isogai, Nishio (JP); Masafumi Sakuma, Chiryu (JP); Ryoji Mizutani, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 273 days.

(21) Appl. No.: 12/818,697

(22) Filed: Jun. 18, 2010

(65) Prior Publication Data

US 2010/0320853 A1 Dec. 23, 2010

(30) Foreign Application Priority Data

Jun. 18, 2009 (JP) ................................. 2009-145668

(51) Int. Cl.
*H02K 11/00* (2006.01)
(52) U.S. Cl. ........................................................ 310/71
(58) Field of Classification Search .................... 310/71; 439/364, 709, 801; 29/596–598
See application file for complete search history.

(56) References Cited

U.S. PATENT DOCUMENTS

| | | | | |
|---|---|---|---|---|
| 4,880,391 A * | 11/1989 | Hurtgen | ........................ | 439/221 |
| 5,206,777 A * | 4/1993 | Clarey et al. | ..................... | 361/63 |
| 5,222,572 A * | 6/1993 | Yamagiwa et al. | ........... | 180/220 |
| 5,713,766 A * | 2/1998 | Davies et al. | ................. | 439/709 |
| 5,857,874 A * | 1/1999 | Takeuchi | ................ | 439/620.26 |
| 7,811,116 B2 * | 10/2010 | Sakakura et al. | ............. | 439/364 |
| 2002/0043883 A1* | 4/2002 | Shimizu | .......................... | 310/71 |
| 2002/0050752 A1* | 5/2002 | Katsuzawa et al. | ............. | 310/71 |
| 2010/0320852 A1* | 12/2010 | Isogai et al. | ..................... | 310/71 |

FOREIGN PATENT DOCUMENTS

| | | |
|---|---|---|
| JP | 11-178266 A | 7/1999 |
| JP | 2002-186217 A | 6/2002 |

* cited by examiner

*Primary Examiner* — Tran Nguyen
(74) *Attorney, Agent, or Firm* — Buchanan Ingersoll & Rooney PC (57) ABSTRACT

An electric motor includes a stator having a stator coil, a rotor, a motor housing having a through hole, a fixing portion extending from the stator within the motor housing towards the through hole, a load receiving member inserted into the through hole and having a through bore, a conductive member connected to an electric power supply wire member and arranged at a first end portion of the load receiving member, a first terminal connected to the stator coil and provided between a second end portion of the load receiving member and the fixing portion, and a screw bolt fixing the conductive member, the load receiving member and the first terminal on the fixing portion, so that the load receiving member is press-fixedly sandwiched by the conductive member and the first terminal so that an electric power flows therebetween via the load receiving member.

15 Claims, 4 Drawing Sheets

ELECTRIC MOTOR HAVING WIRE CONNECTION STRUCTURE AND WIRE CONNECTION METHOD FOR THE SAME

CROSS REFERENCE TO RELATED APPLICATIONS

This application is based on and claims priority under 35 U.S.C. §119 to Japanese Patent Application 2009-145668, filed on Jun. 18, 2009, the entire content of which is incorporated herein by reference.

TECHNICAL FIELD

This disclosure generally relates to an electric motor having a wire connection structure and a wire connection method adapted to the electric motor in order to connect a wire for supplying an electric power from an external source to the electric motor.

BACKGROUND

Disclosed in JPH11-178266A is a motor, which is configured so that a connector opening portion is formed at a motor frame accommodating a stator and an external connector for guiding an external power wire (i.e. a wire for supplying an electric power from an external source to the motor) is provide at the connector opening portion. According to the motor disclosed in JPH11-178266A, a terminal block is provided at the stator. Furthermore, an internal connector, which accommodates a terminal connected to a stator wire, is formed at the terminal block. The external connector and the internal connector are engaged within the motor frame, so that an electric power generated by the external source is supplied to the stator wire.

According to the motor disclosed in JPH11-178266A, the stator wire is connected to the external power wire by engaging the external connector and the internal connector. As a result, an excessive load is expected to be avoided from being applied to each component of the motor. Additionally, disclosed in JP2002-186217A is a motor, which is configured so that a terminal block having a circuit for supplying an electric power to a stator wire is arranged adjacent to an end portion of a stator in an axial direction of the motor and has an opening portion whose diameter is larger than a diameter of a rotor core at an axial center portion of the terminal block. Furthermore, the motor disclosed in JP2002-186217A is configured so that a rotor is assembled to a motor frame even after a stator, the terminal block and the like are assembled to the motor frame.

According to the motor disclosed in JPH11-178266A, the motor frame is configured with plural pieces. Therefore, in a case where mating surfaces of the pieces correspond to a portion of the motor frame at which the external connector is attached, the connector opening portion may not be formed at the motor frame. In other words, the mated surfaces of the motor frame may be unintentionally opened (disengaged) because of the attachment of the external connector to the motor frame. Generally, a position of mating surfaces is subjected to restrictions because of a structure of a forming die and the like when manufacturing the motor frame. Hence, the above-mentioned drawback may not be avoided.

On the other hand, the motor disclosed in JP2002-186217A may not ensure a sufficient conductor area at the circuit, which supplies the electric power and which is formed at the terminal block, because a size of the terminal block is limited due to the opening portion formed at the axial center portion of the terminal block. Therefore, the motor disclosed in JP2002-186217A may not be adapted to a motor using a high electric current.

A need thus exists to provide a wire connection structure and a wire connection method for an electric motor which are not susceptible to the drawback mentioned above.

SUMMARY

According to an aspect of this disclosure, an electric motor having a wire connection structure for connecting an electric power supply wire member supplying an electric power from outside of the electric motor with the electric motor, the electric motor includes a stator having at least one of stator coils, a rotor arranged at an inner side relative to an inner circumferential surface of the stator while allowing the rotor to be rotatable relative to the stator, a motor housing accommodating therewithin the stator and the rotor, a through hole formed at the motor housing, a fixing portion formed at the stator so as to extend from an inside of the motor housing towards the through hole, at least one of load receiving members inserted into the through hole from an outside of the housing and having a through bore whose one end portion opens to the fixing portion, at least one of conductive members connected to the electric power supply wire member and arranged at a first end portion of the load receiving member, at least one of first terminals connected to the stator coil and provided between a second end portion of the load receiving member and the fixing portion, and at least one of screw bolts fixing the conductive member, the load receiving member and the first terminal on the fixing portion, and the load receiving member is press-fixedly sandwiched by the conductive member and the first terminal by means of the screw bolt, so that the conductive member and the first terminal are connected so as to be conductive therebetween via the load receiving member.

According to another aspect of this disclosure, a wire connection method of an electric motor, which includes a stator having a stator coil, a rotor arranged at an inner side relative to an inner circumferential surface of the stator and a motor housing accommodating therewithin the stator and the rotor and having a through hole, the wire connection method for connecting an electric power supply wire member for supplying an electric power from an outside of the electric motor to the electric motor, the connecting method includes a step of forming a fixing portion on the stator so as to extend towards the through hole from an inside of the stator, a step of inserting a load receiving member having a through bore into the through hole, so that one of opening portions of the load receiving member opens towards the fixing portion, a step of arranging a conductive member, which is connected to the electric power supply wire member, so as to face a first end portion of the load receiving member, a step of arranging a first terminal, which is connected to the stator coil, between a second end portion of the load receiving member and the fixing portion, and a step of fixing the conductive member and the first terminal on the fixing portion by means of a screw bolt, so that the load receiving member is press-fixedly sandwiched by the conductive member and the first terminal in order to connect the conductive member and the first terminal so as to be conductive therebetween.

BRIEF DESCRIPTION OF THE DRAWINGS

The foregoing and additional features and characteristics of this disclosure will become more apparent from the fol

DETAILED DESCRIPTION

An embodiment of a wire connection structure between an in-wheel motor 1, which serves as an electric motor, and an electric power supply wiring member 6 will be described below with reference to FIGS. 1 to 5. In this embodiment, a near side to a reader of the drawings in FIG. 1 and a left side in FIG. 2 correspond to a front portion of a vehicle. However, directions are not limited to directions to be mentioned in this disclosure. In this embodiment, an up-and-down direction in FIGS. 1 and 2 substantially corresponds to an up-and-down direction of the vehicle. Additionally, a tire, which is to be attached on a front wheel 8, is not illustrated in FIG. 1.

Figure 1:
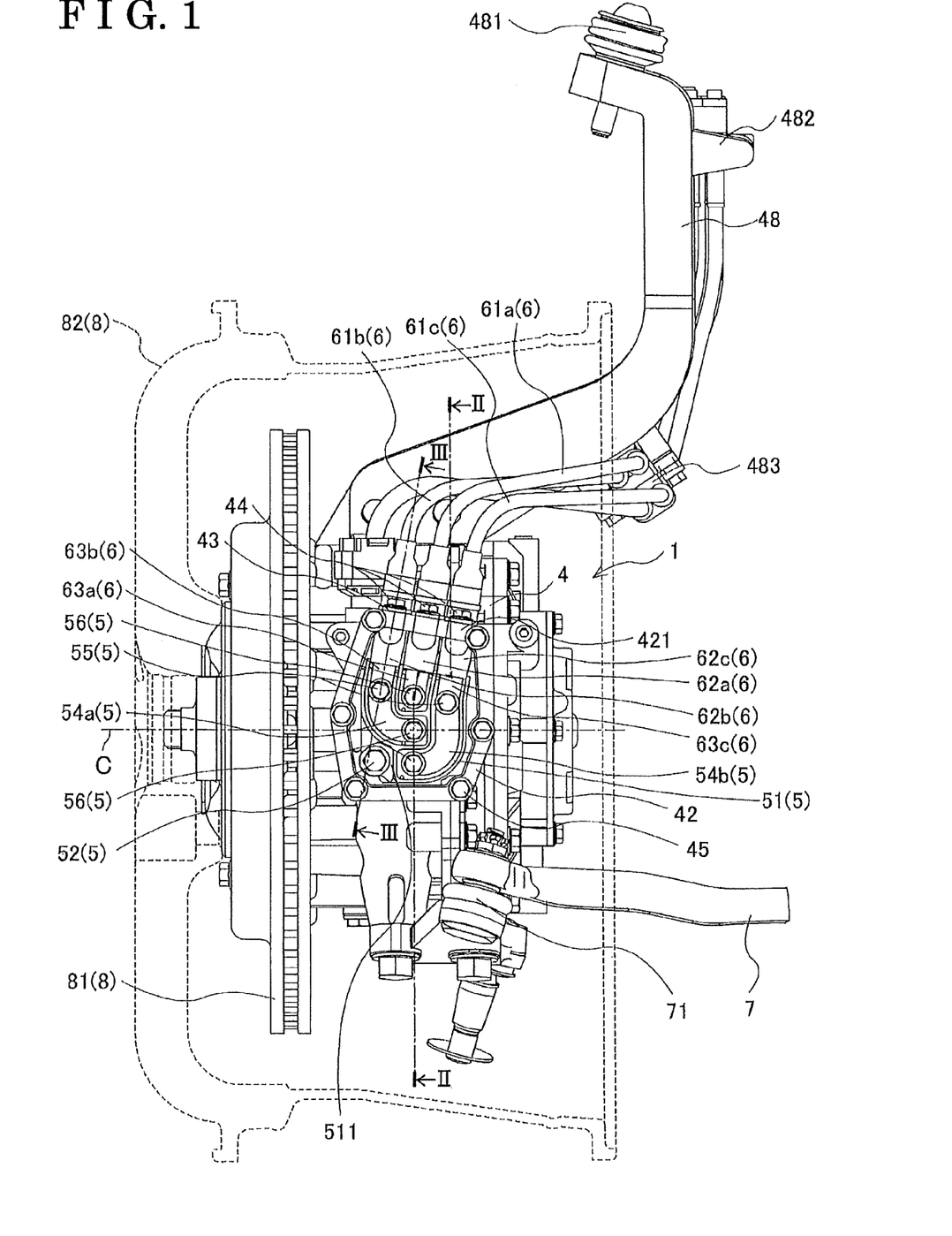
- FIG. 1 is a diagram illustrating a front wheel to which an in-wheel motor according to an embodiment is attached.

As illustrated in FIG. 1, the in-wheel motor 1 is arranged inside of the front wheel 8 (which serves as a driving wheel) of the vehicle. The in-wheel motor 1 is connected to a knuckle arm 48, which serves as an attachment member and to which a steering force of the vehicle is inputted, at an upper portion of the in-wheel motor 1. The knuckle arm 48 supports the front wheel 8 together with the in-wheel motor 1. Furthermore, the in-wheel motor 1 is connected to a lower arm 7, which configures a portion of a front suspension, at a lower portion of the in-wheel motor 1.

A disk rotor 81, which configures a portion of the front wheel 8 and which is connected to a speed reduction mechanism of the in-wheel motor 1, is arranged at the left of the in-wheel motor 1 in FIG. 1. A disk wheel 82 is arranged at the left of the disk rotor 81 in FIG. 1, so that the disk wheel 82 covers the disk rotor 81 and the in-wheel motor 1. The tire is attached at the disk wheel 82, thereby configuring the front wheel 8 of the vehicle.

An upper ball joint 481 is formed at an upper end portion of the knuckle arm 48, so that the knuckle arm 48 is connected to an upper arm of the front suspension via the upper ball joint 481. A lower ball joint 71 is formed at an end portion of the lower arm 7. Accordingly, the in-wheel motor 1, the knuckle arm 48, the disk rotor 81 and the disk wheel 82 are pivotable as a unit about the upper ball joint 481 and the lower ball joint 71 in a substantially horizontal direction in response to an operation of a steering wheel of the vehicle.

Figure 2:
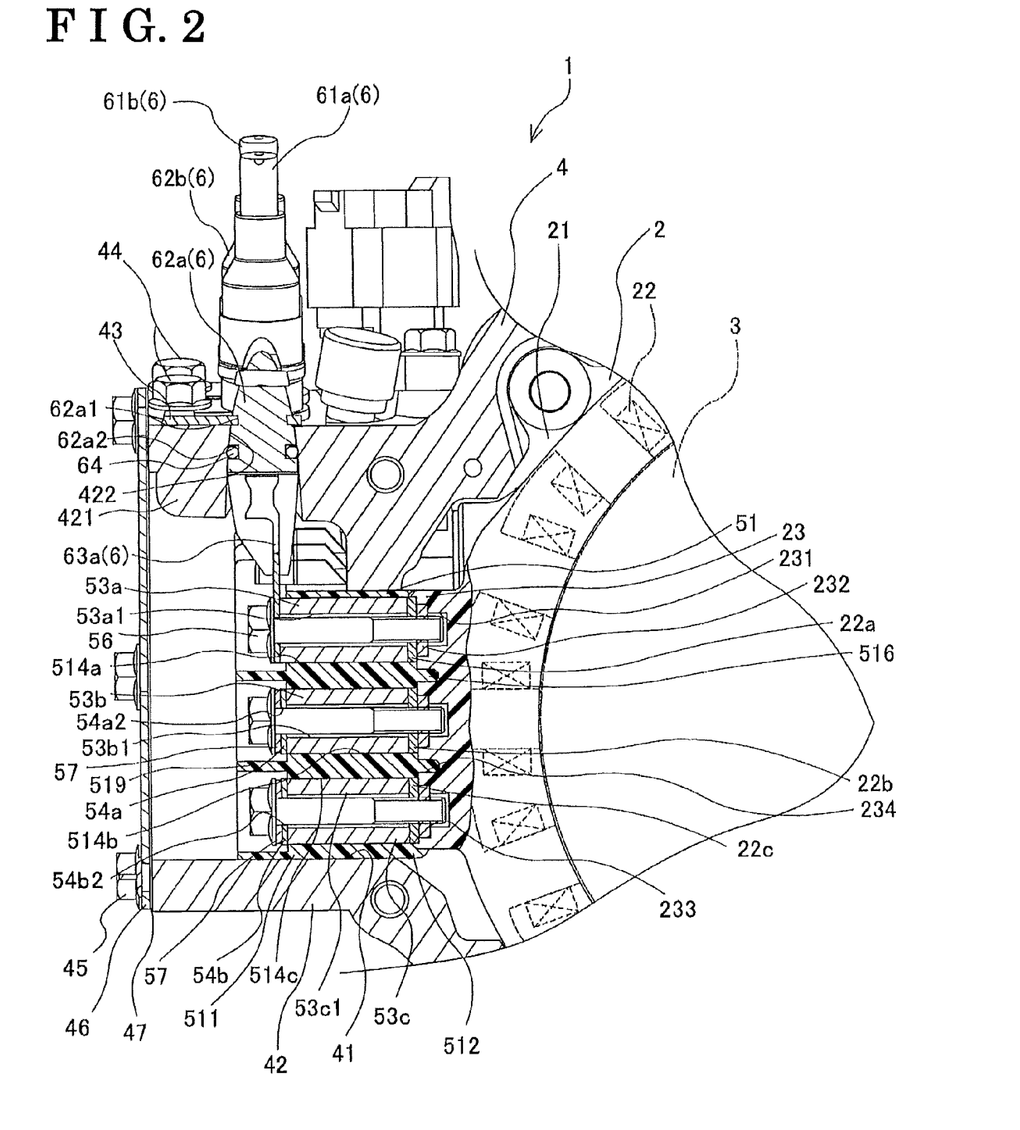
FIG. 2 is a cross-sectional diagram taken along line II-II in FIG. 1.

A known three-phase synchronous motor is adapted as the in-wheel motor 1. More specifically, as illustrated in FIG. 2, the in-wheel motor 1 includes a stator 2, a rotor 3 and a motor housing 4. The rotor 3 is arranged so as to keep a slight clearance between an inner circumferential portion of the stator 2 and the rotor 3, while allowing the rotor 3 to be rotatable. The motor housing 4 is formed in a substantially cylindrical shape, so that the motor housing 4 accommodates therewithin the stator 2 and the rotor 3. Furthermore, the motor housing 4 is connected to the knuckle arm 48.

The stator 2 includes plural stator coils 22, which are retained at an inner side relative to an inner circumferential portion of a stator housing 21 in circular manner, in order to generate a rotating magnetic field. The stator coils 22 are connected to an inverter by means of the electric power supply wiring member 6. The inverter is connected to a high-voltage battery of the vehicle. Accordingly, the electric power is supplied to the stator coils 22 from the high-voltage battery, thereby rotating the rotor 3 of the in-wheel motor 1. A speed of a rotation of the rotor 3 is reduced by means of the speed reduction mechanism. Then, the decelerated rotation of the rotor 3 is transmitted to the disk wheel 82 via the disk rotor 81, thereby driving the front wheel 8 about a rotational axis C.

The wire connection structure between the in-wheel motor 1 and the electric power supply wiring member 6 will be described below in more detail. Each of the stator coils 22 of the stator 2 is covered with an insulating resin member. The insulating resin member is formed so as to outwardly protrude from a portion of an outer circumferential portion of the stator 2 in a radial direction thereof, thereby forming a terminal attaching portion 23, which serves as a fixing portion (see FIG. 2). The terminal attaching portion 23 is formed in a substantially cuboid shape, so that the terminal attaching portion 23 is engageable with a collar holding portion 512, which is formed at a bottom surface of a terminal block 51.

A terminal block insertion hole 41, which serves as a through hole, is formed at an outer wall of the motor housing 4 so as to penetrate therethrough, so that an outer side thereof becomes in communication with an inner side thereof. The terminal attaching portion 23 is arranged within the motor housing 4 so as to face the terminal block insertion hole 41 from the inside of the motor housing 4. The terminal block insertion hole 41 is formed in a substantially rectangular shape, so that the collar holding portion 512 of the terminal block 51 is insertable into the terminal block insertion hole 41.

Three screw accommodating bores 231 are formed at an end surface portion of the terminal attaching portion 23 positioned closer to the terminal block insertion hole 41 (i.e. at a left end surface portion of the terminal attaching portion 23 in FIG. 2). Each of the screw accommodating bores 231 is formed so that an axis thereof extends in a horizontal direction in FIG. 2 and so that the screw accommodating bores 231 are arranged in parallel with each other in a vertical direction. In other words, the screw accommodating bores 231 are formed so as to align in the vertical direction on the terminal block attaching portion 23. Each of the screw accommodating bores 231 is formed so as not to penetrate through the terminal block attaching portion 23. In other words, each of the terminal accommodating bores 231 is formed in a pouch shape (a bore having a bottom portion).

Three mounting nuts 232 made of a metal are provided at the terminal attaching portion 23 by means of an insert molding. More specifically, each of the mounting nuts 232 is provided at the terminal attaching portion 23 so as to surround the corresponding screw accommodating bore 231. An external thread portion, which is formed at an inner circumferential surface of each of the mounting nuts 232, is formed so as to inwardly extent from the corresponding screw accommodating bore 231.

A stepped portion 233 is formed between an end surface of each of the terminal attaching portions 23 and the corresponding mounting nut 232. Each of the stepped portions 233 is formed as if an end surface of the terminal attaching portion 23 is dug down in a perfect circular shape. Coil terminals 22a, 22b and 22c (first terminals), which are connected to the stator coils 22, are arranged within the stepped portions 233, respectively. The coil terminals 22a, 22b and 22c supply a three-phase alternating current to the stator coil 22. Furthermore, each of the coil terminals 22a, 22b and 22c is formed in a manner where a shaping is applied to a metal plate having conductivity. Each of the coil terminals 22a, 22b and 22c is connected to a predetermined numbers of the stator coils 22. Additionally, an insertion hole is formed at a portion of each of the coil terminals 22a, 22b and 22c corresponding to each of the screw accommodating bores 231.

The coil terminal 22a, which is positioned at an upper most among the coil terminals 22a, 22b and 22c in FIG. 2, serves as a coil terminal for a V-phase, which will be hereinafter referred to as a V-phase coil terminal 22a. The coil terminal 22b arranged at middle among the coil terminals 22a, 22b and 22c in FIG. 2 serves as a coil terminal for a W-phase, which will be hereinafter referred to as a W-phase coil terminal 22b. Furthermore, the coil terminal 22c positioned at a bottom most among the coil terminals 22a, 22b and 22c in FIG. 2 serves as a coil terminal for a U-phase, which will be hereinafter referred to as a U-phase coil terminal 22c. In this embodiment, the V-phase coil terminal 22a, the W-phase coil terminal 22b and the U-phase coil terminal 22c are also referred to as the coil terminals 22a, 22b and 22c in order to comprehensively refer to the coil terminals.

A pair of slots 234 is formed at the end surface of the terminal attaching portion 23, so that parting plates 516, which are formed at the collar holding portion 512 of the terminal block 51, are engageable with the slots 234, respectively. More specifically, one of the slots 234 is formed at the end surface of the terminal attaching portion 23 between the screw accommodating bore 231, which is positioned at an upper most among the screw accommodating bores 231, and the screw accommodating bore 231, which is positioned in middle among the screw accommodating bores 231, so as to extend in a lateral direction in FIG. 1. The other slot 234 is formed at the end surface of the terminal attaching portion 23 between the screw accommodating bore 231, which is positioned at the middle, and the screw accommodating bore 231, which is positioned at a bottom most among the screw accommodating bores 231, so as to extend in the lateral direction in FIG. 1.

A blocking wall 42 is formed at the motor housing 4 so that the terminal block insertion hole 41 is surrounded on all four sides thereof by the blocking wall 42 (see FIG. 1). More specifically, the blocking wall 42 is integrally formed at the motor housing 4 so as to outwardly protrude from an outer circumferential surface of the motor housing 4. Three attachment bores 422 are formed at a cable attaching portion 421 of the blocking wall 42 (see FIG. 2). End portions of cables 61a, 61b and 61c, which configure the electric power supply wiring member 6, are engaged with and fixed within the attachment bores 422, respectively.

The cables 61a, 61b and 61c are configured so as to supply the three-phase alternating current to the coil terminals 22a, 22b and 22c. More specifically, the cable 61a arranged in middle among the cables 61a, 61b and 61c serves as a cable for the V-phase, which will be hereinafter referred to as a V-phase cable 61a. The cable 61b arranged at left among cables 61a, 61b and 61c serves as a cable for the W-phase, which will be hereinafter referred to as a W-phase cable 61b. Furthermore, the cable 61c, which is arranged at right among the cables 61a, 61b and 61c serves as a cable for the U-phase, which will be hereinafter referred to as a U-phase cable 61c. The V-phase cable 61a, the W-phase cable 61b and the U-phase cable 61c will be also referred to as the cables 61a, 61b and 61c in a case of comprehensively referring to the V-phase cable 61a, the W-phase cable 61b and the U-phase cable 61c.

As illustrated in FIG. 1, the cables 61a, 61b and 61c are held by a first clamp 482 and a second clamp 483 so as to downwardly extend along the knuckle arm 48 while avoiding a contact with other components when the front wheel 8 is steered.

A method of attaching the cables 61a, 61b and 61c to the blocking wall 42 will be described below. In this embodiment, the attaching method of the cables 61a, 61b and 61c will be explained with the V-phase cable 61a as an example with reference to FIG. 2. The W-phase cable 61b and the U-phase cable 61c are also attached to the blocking wall 42 in the same manner as the V-phase cable 61a is being attached to the blocking wall 42.

A plug 62a, through which a conductor extends at a center portion thereof, is formed at the end portion of the V-phase cable 61a. A terminal 63a (a second terminal), which serves as a conductive member (a current carrying member), protrudes from an end portion of the plug 62a. The terminal 63a is formed by applying a processing to a metal plate having conductivity and is connected to the conductor. An attachment groove 62a1 in a circular shape is formed at a side surface of the plug 62a. An attachment plate 43 is fixed on an upper surface of the cable attaching portion 421 by means of plate screws 44. The plug 62a is inserted through the attachment plate 43 and the cable attaching portion 421 so as to penetrate therethrough until the attachment plate 43 engages with the attachment groove 62a1. As a result, the plug 62a is fixed at the cable attaching portion 421.

A seal groove 62a2 in a ring-shape is formed at the side surface of the plug 62a at a position differing from the position where the attachment groove 62a1 is formed. An o-ring 64 is attached on the seal groove 62a2. Accordingly, the o-ring 64 contacts an inner circumferential surface of the attachment bore 422 after the plug 62a is inserted into the cable attaching portion 421, thereby avoiding water from entering within the blocking wall 42 from outside thereof.

A closing plate 46 is attached at an end surface of the blocking wall 42 (i.e. a left end surface of the blocking wall 42 in FIG. 2) by means of plural screws 45. A gasket 47 is provided between the closing plate 46 and the end surface of the blocking wall 42, so that a space surrounded by the blocking wall 42 is fluid-tightly blocked from the outside of the blocking wall 42. Additionally, the closing plate 46 is not attached on the motor housing 4 in FIG. 1.

A wire connecting structure unit 5, which is a main subject of this disclosure, will be described below. The terminal block 51, which serves as a base block and which configures the wire connecting structure unit 5, is attached at the motor housing 4 so as to be arranged within the blocking wall 42 (see FIG. 1). More specifically, the terminal block 51 is integrally formed by means of a synthetic resin having insulation properties. Furthermore, as illustrated in FIGS. 4 and 5, the terminal block 51 includes a main body 511 and the collar holding portion 512, which is formed at a bottom surface of the main body 511.

Figure 4:
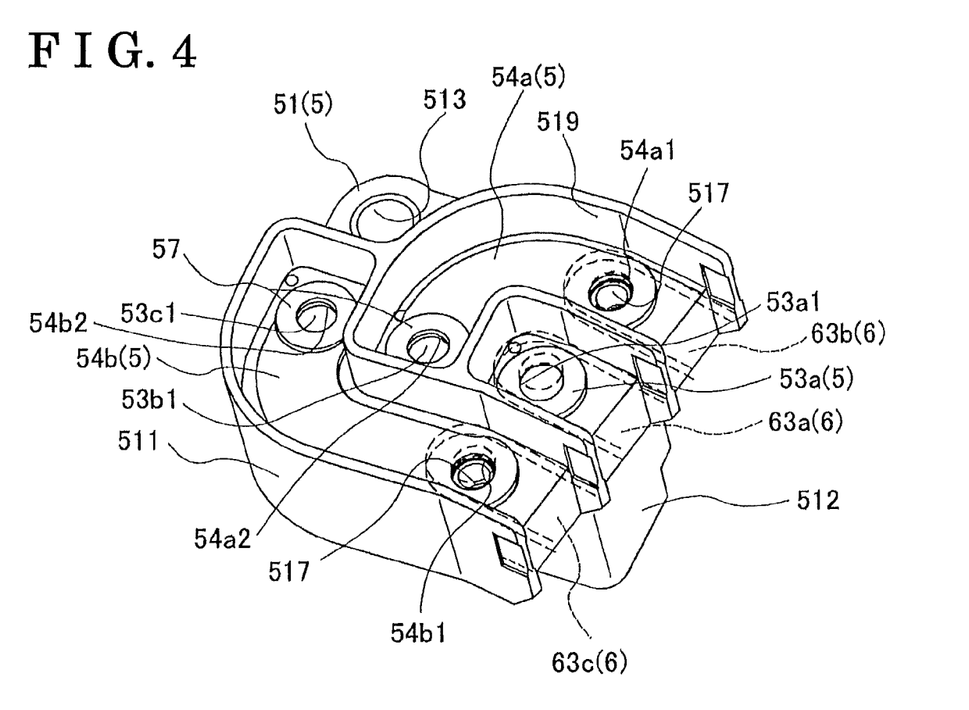
FIG. 4 is a perspective view illustrating a terminal block to which a bus bar and the like are assembled.
Figure 5:
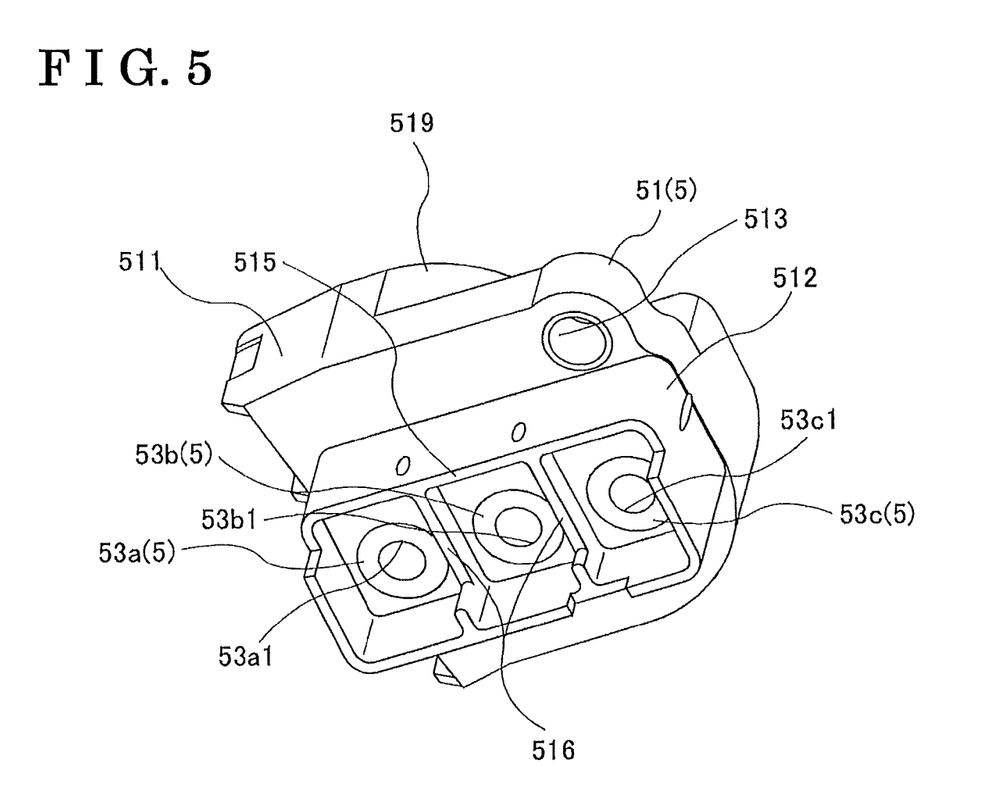
FIG. 5 is a perspective view illustrating the terminal block when being viewed from a stator.

As illustrated in FIGS. 4 and 5, an attachment hole 513 is formed at the main body 511 of the terminal block 51 so as to penetrate therethrough. The terminal block 51 is fixed on the motor housing 4 within the blocking wall 42 in a manner where an attachment bolt 52 penetrating through the attachment hole 513 is screwed on the outer wall of the motor housing 4 (see FIG. 1).

As illustrated in FIG. 2, three collar holding bores 514a, 514b, 514c are formed at the main body 511 of the terminal block 5 so as to correspond to the screw accommodating bores 231 formed at the terminal attaching portion 23, respectively. More specifically, three collar holding bores 514a, 514b and 514c are formed so as to align in the vertical direction at a substantially intermediate portion of the main body 511 in FIG. 1.

The collar holding bore 514a arranged at an upper most among the collar holding bores 514a, 514b and 514c in FIG. 2 serves as a collar holding bore for the V-phase, which will be hereinafter referred to as a V-phase collar holding bore 514a. The collar holding bore 514b arranged in middle among the collar holding bores 514a, 514b and 514c serves as a collar holding bore for the W-phase, which will be hereinafter referred to as a W-phase collar holding bore 514b. Furthermore, the collar holding bore 514c arranged at a bottom most among the collar holding bores 514a, 514b and 514c serves as a collar holding bore for the U-phase, which will be hereinafter referred to as a U-phase collar holding bore 514c. Each of the collar holding bores 514a, 514b and 514c is formed so as to penetrate through the main body 511 and the collar holding portion 512. Additionally, the V-phase collar holding bore 514a, the W-phase collar holding bore 514b and the U-phase collar holding bore 514c are also referred to as the collar holding bores 514a, 514b and 514c in order to comprehensively refer to the V-phase collar holding bore 514a, the W-phase collar holding bore 514b and the U-phase collar holding bore 514c.

As illustrated in FIG. 2, a V-phase collar 53a is fitted into the V-phase collar holding bore 514a. A W-phase collar 53b is fitted into the W-phase collar holding bore 514b. Furthermore, a U-phase collar 53c is fitted into the U-phase collar holding bore 514c. Each of the V-phase collar 53a, the W-phase collar 53b and the U-phase collar 53c serves as a load receiving member. Additionally, the V-phase collar 53a, the W-phase collar 53b and the U-phase collar 53c are also referred to as the collars 53a, 53b and 53c in order to comprehensively refer to the V-phase collar 53a, the W-phase collar 53b and the U-phase collar 53c.

A copper alloy, which is a conductive metal, is used as a base material of each of the collars 53a, 53b and 53c. Furthermore, tinning is applied to surfaces of the base material. Alternatively, each of the collars 53a, 53b and 53c may be formed with an aluminium alloy as the base material. In this case, material costs may be reduced and furthermore, manufacturing costs of the collars 53a, 53b and 53c may be reduced because a plate processing on the surfaces of the collars 53a, 53b and 53c becomes unnecessary.

The collars 53a, 53b and 53c, each of which is formed in an elongated shape, are formed in a cylindrical shape, so that bolt bores 53a1, 53b1 and 53c1 extend through center portions of the collars 53a, 53b and 53c, respectively. Furthermore, each of the bolt bores 53a1, 53b1 and 53c1 opens to the terminal attaching portion 23 of the stator 2 (see FIG. 2).

The collars 53a, 53b and 53c are inserted into the respective collar holding bores 514a, 514b and 514c in an elongated direction thereof, so that the coil terminals 22a, 22b and 22c are positioned between end portions of the corresponding collars 53a, 53b and 53c in an axial direction thereof (i.e. inner end portions of the collars 53a, 53b and 53c facing the fixing portion) and the terminal attaching portion 23. Additionally, as illustrated in FIG. 2, the V-phase collar 53a is configured so that an entire length thereof becomes longer than the W-phase collar 53b and the U-phase collar 53c.

The collar holding portion 512 of the terminal block 51 is formed in a substantially rectangular shape surrounded by a wall 515. Furthermore, a pair of parting plates 516 are formed between a pair of side wall surfaces of the wall 515 facing each other so as to separate the collars 53a, 53b and 53c, which are attached on the terminal block 51 (see FIG. 5). The collar holding portion 512 is configured so that the parting plates 516 engage with the slots 234, which are formed at the terminal attaching portion 23 of the stator 2, respectively, after the collar holding portion 512 is inserted into the terminal block insertion hole 41 of the motor housing 4. As a result, the collar holding portion 512 is fixed on the stator 2.

The collars 53a, 53b and 53c are separated from each other by the wall 515 and the parting plates 516 in the case where the collar holding portion 512 is inserted into the terminal block insertion hole 41. Therefore, the terminals 22a, 22b and 22c, which are connected to the respective collars 53a, 53b and 53c, are also separated from each other by the wall 515 and the parting plates 516. Furthermore, each pair of the V-phase terminal 22a and the V-phase collar 53b, the W-phase terminal 22b and the W-phase collar 53b, and the U-phase terminal 22c and the U-phase collar 53c are separated from the motor housing 4 by means of the wall 515 and the parting plates 516. Accordingly, a clearance and a creepage distance are surely ensured between the collar 53a, 53b and 53c, between the coil terminals 22a, 22b and 22c, and between each pair of the V-phase terminal 22a and the V-phase collar 53b, the W-phase terminal 22b and the W-phase collar 53b, and the U-phase terminal 22c and the U-phase collar 53c on the one hand and at the motor housing 4 on the other. As a result, an insulation of each of the collars 53a, 53c and 53c, each of the coil terminals 22a and 22b and 22c, and between the coil terminals 22a, 22b and 22c, and between each pair of the V-phase terminal 22a and the V-phase collar 53b, the W-phase terminal 22b and the W-phase collar 53b, and the U-phase terminal 22c and the U-phase collar 53c on the one hand and at the motor housing 4 on the other is surely ensured.

Figure 3:
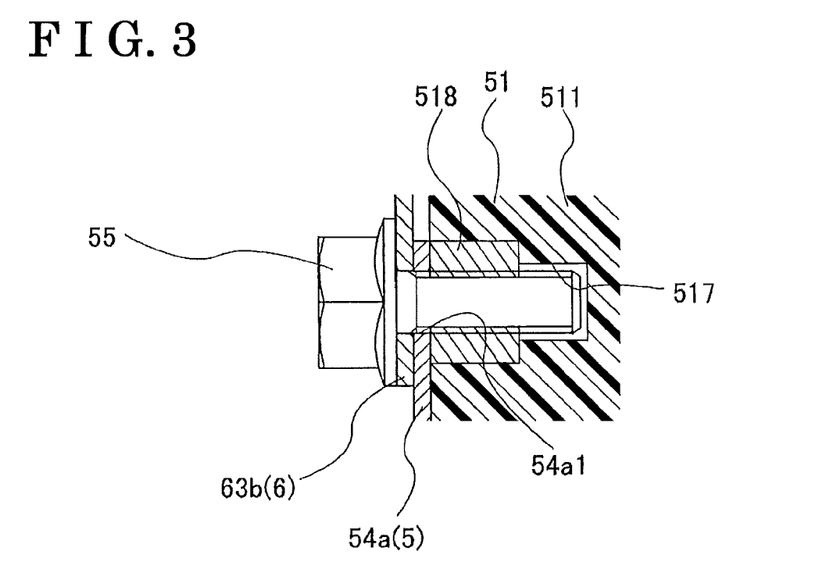
FIG. 3 is a cross-sectional diagram taken along line III-III in FIG. 1.

As illustrated in FIG. 4, a pair of terminal fixing bores 517 (insertion bores) are formed on the main body 511 of the terminal block 51 so as to be positioned aside of the V-phase collar 53a (i.e. so that the V-phase collar 53a is positioned between the terminal fixing bores 517). Furthermore, as illustrated in FIG. 3, each of the terminal fixing bores 517 is formed in a pouch shape (i.e. a bore having a bottom portion) and does not penetrate through the main body 511. A metal nut member 518 having an internal thread portion at an inner circumferential surface thereof is inserted into each of the terminal fixing bores 517.

As illustrated in FIG. 4, a W-phase bus bar 54a is placed on the main body 511, at which one of the terminal fixing bores 715 (i.e. the terminal fixing bore positioned at the left in FIG. 1) is formed, so that the W-phase bus bar 54a is positioned at an upper portion of the main body 511 in FIG. 4. The W-phase bus bar 54a is made of a metal plate having conductivity as a base material, and tinning is applied to surfaces of the metal plate. The W-phase bus bar 54a is formed so as to curve. Furthermore, the W-phase bus bar 54a includes a fixing hole 54a1 at an end portion thereof so as to correspond to the terminal fixing bore 517.

A W-phase terminal 63b (the second terminal), which is connected to the end portion of the W-phase cable 61b, is placed on an upper surface of the W-phase bus bar 54a at the end portion thereof where the fixing hole 54a1 is formed. More specifically, a through hole is formed at the W-phase terminal 63b, and the W-phase terminal 63b is placed on the W-phase bus bar 54a in the state where the through hole corresponds to the fixing hole 54a1 of the W-phase bus bar 54a. Then, a terminal fixing bolt 55 is inserted through the through hole of the W-phase terminal 63b and the fixing hole 54a1 of the W-phase bus bar 54a, and is screwed into the nut member 518. Accordingly, the W-phase terminal 63b and the W-phase bus bar 54a are fixed on the terminal block 51, so that the electric current flows between W-phase terminal 63b and the W-phase bus bar 54a.

Similarly, a U-phase bus bar 54b is placed on the main body 511 where the other one of the terminal fixing bores 715 (i.e. the terminal fixing bore positioned at the right in FIG. 1) is formed, so that the U-phase bus bar 54b is positioned at a lower portion of the main body 511 in FIG. 4. The U-phase bus bar 54b is made of a metal plate having conductivity as a base material, and tinning is applied to surfaces of the metal plate. The U-phase bus bar 54b is formed so as to curve. Furthermore, the U-phase bus bar 54b includes a fixing hole 54b1 at an end portion thereof so as to correspond to the terminal fixing bore 517. Additionally, in this embodiment, a thickness of the U-phase bus bar 54b is set to be the same level as a thickness of the W-phase bus bar 54a.

A U-phase terminal 63c (the second terminal), which is connected to the end portion of the U-phase cable 61c, is placed on an upper surface of the U-phase bus bar 54b at the end portion thereof where the fixing hole 54b1 is formed. More specifically, a through hole is formed at the U-phase terminal 63c, and the U-phase terminal 63c is placed on the U-phase bus bar 54b in the state where the through hole corresponds to the fixing hole 54b1 of the U-phase bus bar 54b. Then, the terminal fixing bolt 55 is inserted through the through hole of the U-phase terminal 63c and the fixing hole 54b1 of the U-phase bus bar 54b, and is screwed into the nut member 518. Accordingly, the U-phase terminal 63c and the U-phase bus bar 54b are fixed on the terminal block 51, so that the electric current flows between U-phase terminal 63c and the U-phase bus bar 54b. Additionally, a unit of the W-phase terminal 63b and the W-phase bus bar 54a serves as the conductive member. Furthermore, a unit of the U-phase terminal 63c and the U-phase bus bar 54b serves as the conductive member.

As illustrated in FIG. 4 (see also FIG. 2), the V-phase collar 53a is formed so that an upper end portion thereof (i.e. a left end portion of the W-phase collar 53a in FIG. 2) protrudes from the upper surface of the terminal block 51 by a length equal to a thickness of each of the bus bars 54a and 54b in the state where the W-phase collar 53a is inserted into the V-phase collar holding bore 514a. The V-phase terminal 63a, which is connected to the end portion of the V-phase cable 61a, is placed on an upper end surface of the V-phase collar 53a (i.e. an outer end portion (a first end portion) of the V-phase collar 53a facing the outside of the motor housing 4) while the V-phase collar 53a is inserted into the V-phase collar holding bore 514a. More specifically, a through hole is formed at the V-phase terminal 63a and the V-phase terminal 63a is placed on the V-phase collar 53a in the state where the through hole corresponds to the bolt bore 53a1 of the V-phase collar 53a.

Then, a collar fixing bolt 56, which serves as a screw bolt, is inserted through the through hole of the V-phase terminal 63a, the bolt bore 53a1 of the V-phase collar 53a and the through hole of the V-phase coil terminal 22a, and is screwed into the mounting nut 232 of the terminal attaching portion 23. Accordingly, the V-phase terminal 63a and the V-phase coil terminal 22a contact with and are fixed on the end portions of the V-phase collar 53a (i.e. the first and second end portions of the W-phase collar 53a in the elongated direction thereof), respectively, by screwing of the collar fixing bolt 56.

Accordingly, the V-phase collar 53a is pressingly sandwiched by the V-phase terminal 63a and the V-phase coil terminal 22a, so that the electric current flows between the V-phase terminal 63a and the V-phase coil terminal 22a via the V-phase collar 53a. Hence, the electric current is supplied to the V-phase coil terminal 22a from the V-phase cable 61a. Furthermore, as described above, the W-phase bus bar 54a and the U-phase bus bar 54b, whose one end portions (first end portions) are fixed on the main body 511 of the terminal block 51, are formed so that the other end portions (second end portions) of the W-phase bus bar 54a and the U-phase bus bar 54b extend to the other end portion of the main body 511. Additionally, a connecting hole 54a2 is formed at the other end portion (the second end portion) of the W-phase bus bar 54a so as to penetrate therethrough. Similarly, a connecting hole 54b2 is formed at the other end portion (the second end portion) of the U-phase bus bar 54b so as to penetrate therethrough.

Each of the W-phase collar 53b and the U-phase collar 53c is formed so that an upper end portion thereof slightly protrudes from the upper surface of the terminal block 51 in the state where each of the W-phase collar 53b and the U-phase collar 53c is inserted into each of the collar holding bores 514b and 514c. The W-phase bus bar 54a is placed on the upper end surface of the W-phase collar 53b (i.e. the end surface of the W-phase collar 53b facing the outside of the motor housing 4) in a state where the connecting hole 54a2 formed at the other end portion of the W-phase bus bar 54a corresponds to the bolt hole 53b1 of the W-phase collar 53b. A spacer washer 57 (which serves as a spacer) for adjusting a height is provided on the upper surface of the W-phase bus bar 54a (see FIG. 4).

Then, the collar fixing bolt 56 is inserted into the spacer washer 57, the connecting hole 54a2 of the W-phase bus bar 54a, the bolt hole 53b1 of the W-phase collar 53b and the through hole of the W-phase coil terminal 22b in this order, and is screwed on the mounting nut 232 of the terminal attaching portion 23. Accordingly, the W-phase bus bar 54a and the W-phase coil terminal 22b contact and are fixed on the end portions of the W-phase collar 53b (i.e. the end portions of the W-phase collar 53b in an elongated direction thereof, first and second end portions of the W-phase collar 53b), respectively, by the screwing of the collar fixing bolt 56. As a result, the W-phase collar 53b is pressingly sandwiched by the W-phase bus bar 54a and the W-phase coil terminal 22a, so that the electric current flows between the W-phase bus bar 54a and the W-phase coil terminal 22b via the W-phase collar 53b. Accordingly, the W-phase coil terminal 22b and the W-phase cable 61b are electrically connected.

Similarly, the U-phase bus bar 54b is placed on the upper end surface of the U-phase collar 53c (i.e. an outer end surface of the U-phase collar 53c facing the outside of the motor housing 4) so that the connecting hole 54b2, which is formed at the other end portion of the U-phase bus bar 54b, corresponds to the bolt hole 53c1 of the U-phase collar 53c. Additionally, the spacer washer 57 for adjusting the height is provided on the upper surface of the U-phase bus bar 54b.

Then, the collar fixing bolt 56 is inserted into the spacer washer 75, the connecting hole 54b2 of the U-phase bus bar 54b, the bolt hole 53c1 of the U-phase collar 53c and the through hole of the U-phase coil terminal 22c in this order, and is screwed on the mounting nut 232 of the terminal attaching portion 23. Accordingly, the U-phase bus bar 54b and the U-phase coil terminal 22c contact and are fixed at the end portions of the U-phase collar 53c (i.e. the end portions of the U-phase collar 53c in an elongated direction thereof, first and second end portions of the U-phase collar 53c), respectively, by the screwing of the collar fixing bolt 56. As a result, the U-phase collar 53c is pressingly sandwiched by the U-phase bus bar 54b and the U-phase coil terminal 22c, so that the electric current flows between the U-phase bus bar 54b and the U-phase coil terminal 22c via the U-phase collar 53c. Accordingly, the U-phase cable 61c is connected to the U-phase coil terminal 22c so that the electric current is supplied to the U-phase coil terminal 22c from the U-phase cable 61c.

As illustrated in FIG. 1, each of the cables 61a, 61b and 61c downwardly extends from the inverter along the knuckle arm 48 and is connected to each of the terminals 63a, 63b and 63c so that the cables 61a, 61b and 61c are attached on the motor housing 4 while aligning in a width direction of the vehicle. Then, the cables 61a, 61b and 61c are aligned in the vertical direction by means of the bus bars 54a and 54b, which are provided on the terminal block 51. Additionally, the terminal block 51, the attachment bolt 52, the collars 53a, 53b and 53c, the bus bars 54a and 54b, the terminal fixing bolts 55, the collar fixing bolts 56 and the spacer washers 57 configure the wire connecting structure unit 5.

A unit of the V-phase terminal 63a, the V-phase collar 53a and the V-phase coil terminal 22a, which are connected by means of the collar fixing bolt 56, serves as a connecting body. A unit of the W-phase bus bar 54a, the W-phase collar 53b and the W-phase coil terminal 22b, which are connected by means of the collar fixing bolt 56, serves as the connecting body. Furthermore, a unit of the U-phase bus bar 54b, the U-phase collar 53c and the U-phase coil terminal 22c, which are connected by means of the collar fixing bolt 56, serves as the connecting body. The entire length of the V-phase collar 53a in the elongated direction thereof is formed to be longer than the entire lengths of the W-phase collar 53b and the U-phase collar 53c in order to level the heights of the terminals 63a, 63b and 63c in a direction vertical to the paper surface of FIG. 1.

In this embodiment, each of the W-phase bus bar 54a and the U-phase bus bar 54b is formed so that the thickness thereof is even. The collar fixing bolts 56 are formed in the same shape so that a single designed collar fixing bolt 56 is commonly used and inserted into each of the collars 53a, 53b and 53c. Furthermore, the spacer washer 75 is provided between the W-phase bus bar 54a and a head portion of the collar fixing bolt 56 and between the U-phase bus bar 54b and the head portion of the collar fixing bolt 56 in order to level the head portions of the collar fixing bolts 56 when being screwed on the terminal attaching portion 23. Additionally, in this embodiment, a thickness of each of the spacer washers 57 is set to the same level as the thickness of the V-phase terminal 63a.

As illustrated in FIG. 4, a parting wall 519, which serves as a wall portion, is provided at the terminal block 51 so as to stand on the main body 511 of the terminal block 51 in order to separate the neighboring terminals 63a, 63b and 63c, the neighboring collars 53a, 53b and 53c, and the bus bars 54a and 54b, and in order to separate a set of the V-phase terminal 63a and the W-phase collar 53a from the motor housing 4, a set of the W-phase terminal 63b, the W-phase collar 53b and the W-phase bus bar 54a from the motor housing 4, and a set of the U-phase terminal 63a, the U-phase collar 53c and the U-phase bus bar 54b from the motor housing 4. Accordingly, the clearances and the creepage distance are ensured between the terminals 63a, 63b and 63c, between the collars 53a, 53b and 53c, between the bus bars 54a and 54b, between the set of the V-phase terminal 63a and the W-phase collar 53a on the one hand and the motor housing 4 on the other, between the set of the W-phase collar 53b and the W-phase bus bar 54a on the one hand and the motor housing 4 on the other, and between the set of the U-phase terminal 63a, the U-phase collar 53c and the U-phase bus bar 54b on the one hand and the motor housing 4 on the other. Therefore, the insulation between the terminals 63a, 63b and 63c, between the collars 53a, 53b and 53c, between the bus bars 54a and 54b, between the set of the V-phase terminal 63a and the W-phase collar 53a on the one hand and the motor housing 4 on the other, between the set of the W-phase collar 53b and the W-phase bus bar 54a on the one hand and the motor housing 4 on the other, and between the set of the U-phase terminal 63a, the U-phase collar 53c and the U-phase bus bar 54b on the one hand and the motor housing 4 on the other is surely ensured.

According to the embodiment, the electric current flows between the V-phase terminal 63a and V-phase coil terminal 22a via the V-phase collar 53a, between the W-phase bus bar 54a and the W-phase coil terminal 22b via the W-phase collar 53b, and between the U-phase bus bar 54b and the U-phase coil terminal 22c via the U-phase collar 53c. As a result, an axial force generated by the collar fixing bolts 56 acts on the V-phase terminal 63a, the bus bars 54a and 54b and the coil terminals 22a, 22b and 22c in a direction of compressing the collars 53a, 53b and 53c by the V-phase terminal 63 and the W-phase coil terminal 22a, by the W-phase bus bar 54a and the W-phase coil terminal 22b and by the U-phase bus bar 54b and the U-phase coil terminal 22c, respectively.

Accordingly, even if a level of the screwing of the collar fixing bolts 56 is increased in order to enhance the conductivity between the V-phase terminal 63a and the bus bars 54a and 54b on the one hand and the coil terminals 22a, 22b and 22c on the other, respectively, an excessive load is avoided from acting on the wire connecting structure unit 5, because the generated axial force is received by the collars 53, 53b and 53c. In other words, a load generated by the screwing of the collar fixing bolts 56 does not act as a bending load or a shear load against the terminal block 51, but acts on the collars 53a, 53b and 53c as a compression load. Therefore, the wire connection structure of the in-wheel motor 1 having a greater load endurance may be achieved.

The wire connection structure may be formed at the outside of the stator 2. Therefore, the wire connection structure may be formed without considering spaces needed for the terminals 63a, 63b and 63c, the bus bars 54a and 54b, the coil terminals 22a, 22b and 22c and the like. Hence, conductive areas of the terminals 63a, 63b and 63c, the bus bars 54a and 54b, the coil terminals 22a, 22b and 22c and the like may be increased, thereby enhancing the conductivity thereof.

In this embodiment, the collars 53a, 53b and 53c penetrate through the motor housing 4, and the coil terminals 22a, 22b and 22c are provided within the motor housing 4 while the terminals 63a, 63b and 63c and the head portions of the corresponding collar fixing bolts 56 are positioned outside of the stator 2. Accordingly, shapes of the coil terminals 22a, 22b and 22c and the terminals 63a, 63b and 63c may be simplified, therefore, an operation of screwing the collar fixing bolts 56 may become easier. Furthermore, the rotor 3 may be assembled to the in-wheel motor 1 after the stator 2 is assembled within the motor housing 4. Therefore, assembling of the in-wheel motor 1 may be facilitated.

In this embodiment, the V-phase terminal 63a and the bus bars 54a and 54b are connected to the coil terminals 22a, 22b and 22c, respectively, so that the electric current flows therebetween via the corresponding collar fixing bolts 56 that are screwed on the terminal attaching portion 23. Therefore, even if mating surfaces exist on the motor housing 4, the mating surfaces do not cause any influence to the conductivity between the V-phase terminal 63a and the bus bars 54a and 54b on the one hand and the coil terminals 22a, 22b and 22b on the other.

Furthermore, even if sizes vary among the collars 63a, 63b and 63c, between the bus bars 54a and 54b, among coil terminals 22a, 22b and 22c, among collar fixing bolts 56 and the like, size differences thereamong may be absorbed by displacing the collars 53a, 53b and 53c in the axial direction. Therefore, the V-phase terminal 63a and the bus bars 54a and 54b are connected to the coil terminals 22a, 22b and 22c, respectively, so that the electric current surely flows therebetween.

The terminals 63b and 63c are fixed on the terminal block 51 together with the one end portions (i.e. the first end portions) of the bus bars 54a and 54b by means of the terminal fixing bolts 55, respectively. On the other hand, the other end portions (i.e. the second end portions) of the bus bars 54a and 54b are positioned at the outer end portions (i.e. the first end portions) of the collars 53b and 53c, respectively. Then, the collar fixing bolt 56 is inserted into the bus bar 54a, the collar 53b and the coil terminal 22b and is screwed on the terminal attaching portion 23. Similarly, the collar fixing bolt 56 is inserted into the bus bar 54b, the collar 53c and the coil terminal 22c and is screwed on the terminal attaching portion 23. Accordingly, an alignment direction of the cables 61a, 61b and 61c may be set to differ from an alignment direction of the connecting bodies (i.e. the unit including V-phase terminal 63a, the collar 53a and the coil terminal 22a, which are connected by means of the collar fixing bolt 56, the unit including the bus bar 54a, the collar 53b and the coil terminal 22b, which are connected by means of the collar fixing bolt 56, and the unit including the bus bar 54b, the collar 53c and the coil terminal 22c, which are connected by means of the collar fixing bolt 56). As a result, the cables 61a, 61b and 61c may be freely wired on the in-wheel motor 1.

In a case where the terminal block 51 is damaged when, for example, a component thereof is replaced and the like, only the terminal block 51 needs to be replaced by another terminal block 51. Hence, replacement costs of the in-wheel motor 1 may be reduced, and furthermore, maintenance of the in-wheel motor 1 may be facilitated. Furthermore, the terminal block 51 may be formed by an integral molding by using a synthetic resin, and the collars 53a, 53b and 53c may be formed by using pipe members. Accordingly, the manufacturing costs of the in-wheel motor 1 may be reduced.

According to the embodiment, the parting wall 519 is formed on the main body 511 of the terminal block 51 and further, the wall 515 and the pair of parting plates 516 are formed on the collar holding portion 512 of the terminal block 51. Accordingly, the insulation between neighboring terminals 63a, 63b, 63c, between neighboring collars 53a, 53b and 53c, between the neighboring bus bars 54a and 54b, between the neighboring coil terminals 22a, 22b and 22c, between the unit of the V-phase terminal 63a, the W-phase collar 53a and the V-phase coil terminal 22a on the one hand and the motor housing 4 on the other, between the nit of the W-phase terminal 63b, the W-phase collar 53b, the W-phase bus bar 54a and the W-phase coil terminal 22b on the one hand and the motor housing 4 on the other, and between the unit of the U-phase terminal 63c, the U-phase collar 53c, the U-phase bus bar 54b and the U-phase coil terminal 22c on the one hand and the motor housing 4 on the other hand may be enhanced. As a result, a high electric current may be supplied to the stator coils 22.

According to the embodiment, the bus bars 54a and 54b and the like are insulated only by forming the parting wall 519 and the like. Accordingly, the size of the terminal block 51 may be reduced. Furthermore, in this embodiment, the spacer washers 57 are provided between the head portions of the respective collar fixing bolts 56 on the one hand and the bus bars 54a and 54b on the other, respectively. Accordingly, the heights of the collar fixing bolts 56, which are penetrated through the terminal block 51 and screwed on the terminal attaching portion 23, may be leveled by means of the spacer washers 57. Therefore, the single-designed (single-sized) collar fixing bolt 56 may be commonly used.

According to the embodiment, each of the collars 53a, 53b and 53c is made of the copper alloy, which is a conductive metal, as the base material, and the tinning is applied to the surfaces of the copper alloy. Accordingly, a friction resistance of the surfaces of each of the collars 53a, 53b and 53c may be reduced. As a result, the friction resistance generated between an outer circumferential surface of the collar fixing bolt 56 and each of the bolt bores 53a1, 53b1 and 53c1 of the respective collars 53a, 53b and 53c may be reduced, while increasing the axial force of the collar fixing bolt 56 when and after the collar fixing bolt 56 is screwed into each of the bolt bores 53a1, 53b1 and 53c1. Accordingly, the conductivity between the V-phase terminal 63a and the bus bars 54a and 54b on the one hand and the coil terminals 22a, 22b and 22c on the other hand, respectively, may be enhanced.

In order to further enhance the conductivity of the in-wheel motor 1, the tinning may be applied to the surfaces of the collar fixing bolts 56 to reduce the friction resistance while increasing the axial force when and after the collar fixing bolts 56 are screwed into the respective bolt bores 53a1, 53b1 and 53c1. Additionally, the in-wheel motor 1 is accommodated within the disk wheel 82 of the front wheel 8, which serves as the driving wheel of the vehicle. Accordingly, the conductivity between the V-phase terminal 63a and the bus bars 54a and 54b on the one hand and the respective coil terminals 22a, 22b and 22c on the other hand may be enhanced even within the disk wheel 82, whose size is set to be relatively small.

Other Embodiments

The disclosure is not limited to the above-described embodiment and may be changed or modified as follows. This disclosure is not limited to the synchronous motor, but the disclosure may be adapted to various electric motors. Furthermore, this disclosure is not limited to a multi-phase motor, but the disclosure may also be adapted to a single-phase motor. Additionally, the disclosure is not limited to the in-wheel motor 1, which is accommodated within the disk wheel 82 of the vehicle, but this disclosure may be adapted to a motor for a vehicle, a motor for a household electric appliance, an industrial motor and the like.

According to the in-wheel motor 1 having the wire connection structure, the V-phase terminal 63a, the set of the W-phase terminal 63b and the W-phase bus bar 54a and the set of the U-phase terminal 63c and the U-phase bus bar 54b on the one hand and the coil terminals 22a, 22b and 22c on the other hand are connected via the collars 53a, 53c and 53c, respectively, so that the electric current flows therebetween. As a result, the axial forces generated by the collar fixing bolts 56 acts on the V-phase terminal 63a, the unit of the W-phase terminal 63b and the W-phase bus bar 54a, the unit of the U-phase terminal 63c and the U-phase bus bar 54b, and the coil terminals 22a, 22b and 22c in the direction of compressing the collars 53a, 53c and 53c by the V-phase terminal 63a and the V-phase coil terminal 22a, by the W-phase terminal 63b, the W-phase bus bar 54a and the W-phase coil terminal 22b and by the U-phase terminal 63c, the U-phase bus bar 54c and the U-phase coil terminal 22c, respectively. Therefore, even if the screwing level of each of the collar fixing bolts 56 is increased, the generated axial force is received by each of the collars 53a, 53c and 53c. As a result, the excessive load may be avoided from acting on the wire connection structure of the in-wheel motor 1.

Furthermore, because the wire connection structure is formed at the outside of the stator 2, the sizes of the V-phase terminal 63a, the unit of the W-phase terminal 63b and the W-phase bus bar 64a, the unit of the U-phase terminal 63c and the U-phase bus bar 64b, the coil terminals 22a, 22b and 22c and the like may not be restricted by a mounting space within the in-wheel motor 1. Therefore, the conductive areas of the V-phase terminal 63a, the unit of the W-phase terminal 63b and the W-phase bus bar 64a, the unit of the U-phase terminal 63c and the U-phase bus bar 64b, the coil terminals 22a, 22b and 22c and the like may be increased in order to enhance the conductivities thereof. Furthermore, the collar fixing bolts 56 are screwed on the terminal attaching portion 23 in order to conductively connect the terminals 63a, 63b and 63c and the coil terminals 22a, 22b and 22c, respectively. Therefore, even if the mating surfaces exist on the motor housing 4, the conductivities between the V-phase terminal 63a, the unit of the W-phase terminal 63b and the W-phase bus bar 54a and the unit of the U-phase terminal 63c and the U-phase bus bar 54b on the one and the coil terminals 22a, 22b and 22c on the other hand, respectively, are not influenced by the mating surfaces.

According to the embodiment, the in-wheel motor 1 further includes the terminal block 51, which is made of an insulating material and which is inserted into the terminal block insertion hole 41. The electric power supply wire member 6 includes plural cables 61a, 61b and 61c, which are connected to the V-phase terminal 63a, the set of the W-phase terminal 63b and the W-phase bus bar 54a and the set of the U-phase terminal 63c and the U-phase bus bar 54b, respectively, in order to supply a multi-phase alternating current to the stator 2. Furthermore, plural stator coils 22 and plural coil terminals 22a, 22b and 22c are provided at the in-wheel motor 1 so as to correspond to the cables 61a, 61b and 61c. The collar fixing bolt 56 is inserted into the V-phase terminal 63a, the V-phase collar 53a and the V-phase coil terminal 22a in order to from a connecting body. Similarly, the collar fixing bolt 56 is inserted into the W-phase terminal 63b, the W-phase bus bar 54a, the W-phase collar 53b and the W-phase coil terminal 22a in order to form the connecting body. Furthermore, the collar fixing bolt 56 is inserted into the U-phase terminal 63c, the U-phase bus bar 54b, the U-phase collar 53c and the U-phase coil terminal 22c in order to from the connecting body. The terminal block 51 includes plural terminal fixing bores 517, into which the corresponding connecting bodies are inserted, the V-phase terminal 63a, the unit of the W-phase terminal 63b and the W-phase bus bar 54a and the unit of the U-phase terminal 63c and the U-phase bus bar 54b on the one hand are connected to the coil terminals 22a, 22b and 22c via the collars 53a, 53b and 53c, respectively, in a manner where the collar fixing bolts 56 are inserted into the respective insertion bores of the terminal block 51 and are screwed on the terminal attaching portion 23. The W-phase terminal 63b and the U-phase terminal 63c, which are connected to the end portions of the cables 61b and 61c, and the W-phase bus bar 54a and the U-phase bus bar 54b, which is made of a conductive material and is connected to the W-phase terminal 63b and the U-phase terminal 63c so as to be conductive therebetween, configure the conductive members, respectively. The W-phase terminal 53b and the U-phase terminal 53c are fixed on the terminal block 51 together with the respective W-phase bus bar 54a and the U-phase bus bar 54b. The W-phase bus bar 54a and the U-phase bus bar 54b are fixed on the terminal attaching portion in the manner where the collar fixing bolts 56 are inserted into the W-phase bus bar 54a and the U-phase 54b, the W-phase collar 53b and the U-phase collar 53c, and the W-phase coil terminal 22b and the U-phase coil terminal 22c, respectively and are screwed on the terminal attaching portion 23.

Accordingly, the W-phase terminal 63b and the U-phase terminal 63c are fixed on the terminal block 51 together with the one end portions of the W-phase bus bars 54a and the U-phase bus bar 54b, respectively. On the other, the other end portions of the bus bars 54a and 54b are attached on the outer end portions of the collars 53b and 53c, respectively. Then, the terminal fixing bolt 55 is inserted into the W-phase bus bar 54a, the W-phase collar 53b and the W-phase coil terminal 22b and is screwed on the terminal attaching portion 23. Similarly, the terminal fixing bolt 55 is inserted into the U-phase bus bar 54b, the U-phase collar 53c and the U-phase coil terminal 22c and is screwed on the terminal attaching portion 23. As a result, the alignment direction of the cables 61a, 61b and 61c may be set to differ from the alignment direction of the connecting bodies. Hence, the cables 61a, 61b and 61c may be freely wired on the in-wheel motor 1.

According to the embodiment, the terminal block 51 includes the parting wall 519, which is formed so as to stand thereon, in order to insulate the neighboring conductive members.

Accordingly, the insulation of the unit of the W-phase terminal 63b and the W-phase bus bar 54a and the unit of the U-phase terminal 63c and the U-phase bus bar 54b, which are arranged aside to each other, may be enhanced by forming the parting wall 519 on the terminal block 51 so as to stand thereon. As a result, the high electric current may be supplied to the stator coils 22.

According to the embodiment, the in-wheel motor 1 further includes the spacer washers 57 between the head portion of each of the collar fixing bolts 56, which is included in the connecting bodies, on the one hand and each of the unit of the W-phase terminal 63b and the W-phase bus bar 54a and the unit of the U-phase terminal 63c and the U-phase bus bar 54b, on the other hand.

Accordingly, the heights of the head portions of the respective collar fixing bolts 56, which are inserted through the terminal block 51 and fixed on the terminal attaching portion 23, may be leveled by providing the spacer washers 57 between the head portions of the collar fixing bolts 56 and the bus bars 54a and 54b, respectively. Therefore, a single-designed collar fixing bolt may be commonly used.

According to the embodiment, each of the collars 53a, 53b and 53c is made of a conductive metal as the base material and the tinning is applied to the surfaces of the conductive metal.

Accordingly, the friction resistance of the through hole of each of the collars 53a, 53b and 53c relative to the outer circumferential surface of the corresponding collar fixing bolt 56 may be reduced by forming each of the collars 53a, 53b and 53c by using a conductive metal as a base material and applying the tinning on surfaces of the conductive metal. As a result, the resistance of the collar fixing bolts 56 may be reduced while increasing the axial force thereof when and after the collar fixing bolts 56 are screwed on the terminal attaching portion 23. Hence, the conductivity between the V-phase terminal 63a, the unit of the W-phase terminal 63b and the W-phase bus bar 54a and the U-phase terminal 63c and the U-phase bus bar 54b of the in-wheel motor 1 on the one hand and the respective coil terminals 22a, 22b and 22b of the in-wheel motor 1 on the other hand may be enhanced.

According to the embodiment, the in-wheel motor 1 is accommodated within the front wheel 8 of the vehicle. The motor housing 4 is fixed at the attachment member supporting the front wheel 8, so that the rotational force of the rotor 2 of the electric motor 1 is transmitted to the front wheel 8.

Accordingly, the conductivity between the V-phase terminal 63a, the unit of the W-phase terminal 63b and the W-phase bus bar 54a and the U-phase terminal 63c and the U-phase bus bar 54b of the in-wheel motor 1 on the one hand and the respective coil terminals 22a, 22b and 22b of the in-wheel motor 1 on the other hand may be enhanced within the front wheel 8, whose inner space is set to be relatively narrow, because the in-wheel motor 1 is accommodated within the front wheel 8 of the vehicle.

Accordingly, the V-phase terminal 63a, the unit of the W-phase terminal 63b and the W-phase bus bar 54a and the unit of the U-phase terminal 63c and the U-phase bus bar 54b on the one hand and coil terminals 22a, 22b and 22c on the other hand are connected via the collars 53a, 53c and 53c, respectively, so that the electric current flows therebetween. Therefore, the axial force generated by the collar fixing bolts 56 acts on the V-phase terminal 63a, the unit of the W-phase terminal 63b and the W-phase bus bar 54a, the unit of the U-phase terminals 63c and the U-phase bus bar 54b and the coil terminals 22a, 22b and 22c in the direction of compressing the collars 53a, 53c and 53c by the V-phase terminal 63a and the V-phase coil terminal 22a, by the unit of the W-phase terminal 63b and the W-phase bus bar 54a on the one hand and the W-phase coil terminal 22b on the other, and by the unit of the U-phase terminal 63c and the U-phase bus bar 54b on the one hand and the U-phase coil terminal 33c, respectively. Therefore, even if the screwing level of the collar fixing bolts 56 is increased in order to enhance the conductivity between the V-phase terminal 63a, the unit of the W-phase terminal 63b and the W-phase bus bar 54a and the U-phase terminal 63c and the U-phase bus bar 54b on the one hand and the respective coil terminals 22a, 22b and 22c on the other hand, the excessive load may be avoided from acting on the wire connection structure of the in-wheel motor 1 because the generated axial force of the collar fixing bolts 56 is received by the collars 53a, 53b and 53c.

Furthermore, because the wire connection structure is formed at the outside of the stator 2, the sizes of the V-phase terminal 63a, the unit of the W-phase terminal 63b and the W-phase bus bar 54a, the unit of the U-phase terminals 63c and the U-phase bus bar 54b and the coil terminals 22a, 22b and 22c may not be restricted. Accordingly, the conductive areas of the V-phase terminal 63a, the unit of the W-phase terminal 63b and the W-phase bus bar 54a, the unit of the U-phase terminals 63c and the U-phase bus bar 54b and the coil terminals 22a, 22b and 22c may be increased in order to further enhance the conductivity therebetween.

The principles, preferred embodiment and mode of operation of this disclosure have been described in the foregoing specification. However, the disclosure which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the disclosure. Accordingly, it is expressly intended that all such variations, changes and equivalents which fall within the spirit and scope of the disclosure as defined in the claims, be embraced thereby.

The invention claimed is:

1. An electric motor having a wire connection structure for connecting an electric power supply wire member supplying an electric power from outside of the electric motor with the electric motor, the electric motor comprising:
a stator having at least one of stator coils;
a rotor arranged at an inner side relative to an inner circumferential surface of the stator while allowing the rotor to be rotatable relative to the stator;
a motor housing accommodating therewithin the stator and the rotor;
a through hole formed at the motor housing;
a fixing portion formed at the stator so as to extend from an inside of the motor housing towards the through hole;
at least one of load receiving members inserted into the through hole from an outside of the housing and having a through bore whose one end portion opens to the fixing portion;
at least one of conductive members connected to the electric power supply wire member and arranged at a first end portion of the load receiving member;
at least one of first terminals connected to the stator coil and provided between a second end portion of the load receiving member and the fixing portion; and
at least one of screw bolts fixing the conductive member, the load receiving member and the first terminal on the fixing portion, and
the load receiving member is press-fixedly sandwiched by the conductive member and the first terminal by means of the screw bolt, so that the conductive member and the first terminal are connected so as to be conductive therebetween via the load receiving member.

2. The electric motor having the wire connection structure according to claim 1 further comprising a base block, which is made of an insulating material and which is inserted into the through hole, wherein the electric power supply wire member includes a plurality of cables, which are connected to a plurality of the conductive members, respectively, in order to supply a multi-phase alternating current to the stator, a plurality of the stator coils and a plurality of the first terminals are provided at the electric motor so as to correspond to the plurality of the cables, the screw bolts are inserted into the conductive members, the load receiving members and the first terminals, respectively, in order to form connecting bodies corresponding to the cables, the base block includes a plurality of insertion bores, into which the corresponding connecting bodies are inserted, so that the conductive members are connected to the first terminals via the corresponding load receiving members, respectively, in a manner where the screw bolts are inserted into the respective insertion bores of the base block and are screwed on the fixing portion, at least one of the plurality of the conductive members includes a second terminal, which is connected to an end portion of the cable, and a bus bar, which is made of a conductive material and is connected to the second terminal so as to be conductive therebetween, the second terminal is fixed on the base block together with the bus bar, and the bus bar is fixed on the fixing portion in a manner where the screw bolt is inserted into the bus bar, the load receiving member and the first terminal and is screwed on the fixing portion.

3. The electric motor having the wire connection structure according to claim 2, wherein the base block includes a wall portion, which is formed so as to stand thereon, in order to insulate the neighboring conductive members.

4. The electric motor having the wire connection structure according to claim 2 further comprising a spacer between a head portion of the screw bolt, which is included in each of the connecting bodies, and each of the conductive members.

5. The electric motor having the wire connection structure according to claim 3 further comprising a spacer between a head portion of the screw bolt, which is included in each of the connecting bodies, and each of the conductive members.

6. The electric motor having the wire connection structure according to claim 1, wherein the load receiving member is made of a conductive metal as a base material and tinning is applied to a surface of the conductive metal.

7. The electric motor having the wire connection structure according to claim 2, wherein each of the load receiving members is made of a conductive metal as a base material and tinning is applied to a surface of the conductive metal.

8. The electric motor having the wire connection structure according to claim 3, wherein each of the load receiving members is made of a conductive metal as a base material and tinning is applied to a surface of the conductive metal.

9. The electric motor having the wire connection structure according to claim 4, wherein each of the load receiving members is made of a conductive metal as a base material and tinning is applied to a surface of the conductive metal.

10. The electric motor having the wire connection structure according to claim 1, wherein the electric motor is accommodated within a driving wheel of a vehicle and the motor housing is fixed at an attachment member supporting the driving wheel, so that a rotational force of the rotor of the electric motor is transmitted to the driving wheel.

11. The electric motor having the wire connection structure according to claim 2, wherein the electric motor is accommodated within a driving wheel of a vehicle and the motor housing is fixed at an attachment member supporting the driving wheel, so that a rotational force of the rotor of the electric motor is transmitted to the driving wheel.

12. The electric motor having the wire connection structure according to claim 3, wherein the electric motor is accommodated within a driving wheel of a vehicle and the motor housing is fixed at an attachment member supporting the driving wheel, so that a rotational force of the rotor of the electric motor is transmitted to the driving wheel.

13. The electric motor having the wire connection structure according to claim 4, wherein the electric motor is accommodated within a driving wheel of a vehicle and the motor housing is fixed at an attachment member supporting the driving wheel, so that a rotational force of the rotor of the electric motor is transmitted to the driving wheel.

14. The electric motor having the wire connection structure according to claim 5, wherein the electric motor is accommodated within a driving wheel of a vehicle and the motor housing is fixed at an attachment member supporting the driving wheel, so that a rotational force of the rotor of the electric motor is transmitted to the driving wheel.

15. A wire connection method of an electric motor, which includes a stator having a stator coil, a rotor arranged at an inner side relative to an inner circumferential surface of the stator and a motor housing accommodating therewithin the stator and the rotor and having a through hole, the wire connection method for connecting an electric power supply wire member for supplying an electric power from an outside of the electric motor to the electric motor, the connecting method comprising;
 a step of forming a fixing portion on the stator so as to extend towards the through hole from an inside of the stator;
 a step of inserting a load receiving member having a through bore into the through hole, so that one of opening portions of the load receiving member opens towards the fixing portion;
 a step of arranging a conductive member, which is connected to the electric power supply wire member, so as to face a first end portion of the load receiving member;
 a step of arranging a first terminal, which is connected to the stator coil, between a second end portion of the load receiving member and the fixing portion; and
 a step of fixing the conductive member and the first terminal on the fixing portion by means of a screw bolt, so that the load receiving member is press-fixedly sandwiched by the conductive member and the first terminal in order to connect the conductive member and the first terminal so as to be conductive therebetween.

* * * * *